United States Patent [19]

Schulze

[11] 4,180,481

[45] Dec. 25, 1979

[54] MANUFACTURE OF A SUPPORTED CHROMIUM OXIDE CATALYST FOR OLEFIN POLYMERIZATION

[75] Inventor: Kurt Schulze, Wesseling, Fed. Rep. of Germany

[73] Assignee: BASF Aktiengesellschaft, Fed. Rep. of Germany

[21] Appl. No.: 929,702

[22] Filed: Jul. 31, 1978

[30] Foreign Application Priority Data

Aug. 3, 1977 [DE] Fed. Rep. of Germany ....... 2734928

[51] Int. Cl.$^2$ .......................... B01J 27/06; B01J 29/00
[52] U.S. Cl. ................................. 252/441; 252/455 R; 252/458
[58] Field of Search ..................... 252/458, 441, 455 R

[56] References Cited

U.S. PATENT DOCUMENTS

| | | | |
|---|---|---|---|
| 3,244,682 | 4/1966 | Czenkusch et al. | 260/88.2 |
| 3,362,946 | 1/1968 | Hogan | 252/458 X |
| 3,445,367 | 5/1969 | Kallenbach | 252/441 X |
| 4,077,904 | 3/1978 | Noshay et al. | 252/441 X |

*Primary Examiner*—Carl Dees
*Attorney, Agent, or Firm*—Keil & Witherspoon

[57] ABSTRACT

A process for the manufacture of a supported chromium oxide catalyst from a catalyst precursor, which in turn is a silica-based finely divided carrier homogeneously charged with a chromium compound—by (1) treating the catalyst precursor, with or without addition of a promoter, with an oxygen-containing gas at an elevated temperature and then (2) treating the product obtained from stage (1) with carbon monoxide, wherein, in both stages (1) and (2), the solid is in the form of a fluidized bed maintained by means of a stream of carrier gas, and wherein furthermore, in stage (1), the treatment with oxygen is carried out at from 400° to 1,500° C. for a period of at least 30 minutes, and in stage (2) the carbon monoxide treatment is carried out at from 250° to 500° C. for a period of from 0.5 to 3 hours using an anhydrous and oxygen-free gas consisting of nitrogen to which a total of from 100 to 1,000 mole %, based on the chromium trioxide content of the product obtained from stage (1), of carbon monoxide is added uniformly over the total period of the carbon monoxide treatment.

2 Claims, No Drawings

MANUFACTURE OF A SUPPORTED CHROMIUM OXIDE CATALYST FOR OLEFIN POLYMERIZATION

The present invention relates to a process for the manufacture of a supported chromium oxide catalyst from a catalyst precursor—which in turn comprises a finely divided carrier consisting of, or based on, silica, homogeneously charged with a chromium compound, which consists of chromium trioxide or a chromium compound which is converted to chromium trioxide under the conditions of stage (1), in the weight ratio of carrier:chromium compound (calculated as chromium trioxide) of from 100:0.1 to 100:10, in particular from 100:0.5 to 100:6,- by (1) treating the catalyst precursor—with or without addition of a promoter in the weight ratio of catalyst precursor:promoter of from 100:0.1 to 100:10, in particular from 100:1 to 100:4-at an elevated temperature with an oxygen-containing gas and then (2) treating the product obtained from stage (1) with carbon monoxide.

Supported catalysts obtainable in this way are conventionally employed in processes for the manufacture of ethylene homopolymers or of ethylene copolymers containing up to 15 mole %, based on ethylene, of α-monoolefins of 3 to 8 carbon atoms, by polymerizing the monomer or monomers at from 100° to 200° C. in a saturated hydrocarbon which is liquid under the process conditions and in which both the monomer or monomers and the polymer formed are soluble.

Such processes exhibit a number of advantages over comparable alternative processes but also still leave a need for certain improvements. One such desired improvement is, for example, to obtain the polymers with a very high catalyst yield, ie. amount by weight of polymer produced per unit weight of catalyst. The desire for this improvement is based on the fact that with increasing catalyst yield the content of catalyst residues in the polymer decreases and if possible this content should be so low that the expensive purification step for the purpose of removing residual materials can be omitted.

It is an object of the present invention to provide a supported chromium oxide catalyst which represents a technical advance and which in particular makes it possible to achieve relatively very high catalyst yields.

I have found that this object is achieved by a supported catalyst manufactured by the process defined at the outset if, both stages (1) and (2), the solid is used in the form of a fluidized bed, under specifically selected conditions.

Accordingly, the present invention relates to a process for the manufacture of a supported chromium oxide catalyst from a catalyst precursor—which in turn comprises a finely divided carrier consisting of, or based on, silica, homogeneously charged with a chromium compound, which consists of chromium trioxide or a chromium compound which is converted to chromium trioxide under the conditions of stage (1), in the weight ratio of carrier:chromium compound (calculated as chromium trioxide) of from 100:0.1 to 100:10, in particular from 100:0.5 to 100:6, —by (1) treating the catalyst precursor—with or without addition of a promoter in the weight ratio of catalyst precursor:promoter of from 100:0.1 to 100:10, in particular from 100:1 to 100:4, —at an elevated temperature with an oxygen-containing gas and then (2) treating the product obtained from stage (1) with carbon monoxide, wherein, in both stages (1) and (2), the solid is in the form of a fluidized bed maintained by means of a stream of carrier gas, and wherein furthermore, in stage (1), the treatment with oxygen is carried out at from 400° to 1,500° C., in particular from 530° to 1,200° C., for a period of at least 30 minutes, using an anhydrous carrier gas which comprises from 10 to 100% by volume of oxygen, the remainder consisting of from 90 to 0% by volume of nitrogen, and in stage (2) the carbon monoxide treatment is carried out at from 250° to 500° C., in particular from 270° to 450° C., for a period of from 0.5 to 3 hours, in particular from 0.75 to 1.5 hours, using an anhydrous and oxygen-free carrier gas consisting of nitrogen to which a total of from 100 to 1,000 mole %, in particular from 150 to 400 mole %, based on the chromium trioxide content of the product obtained from stage (1), of carbon monoxide is added uniformly over the total period of the carbon monoxide treatment.

The starting material for use in the novel process is a particular catalyst precursor. This precursor in itself exhibits no peculiar features and may be of the type conventionally used for supported chromium oxide catalysts intended for the polymerization of olefins.

For the purpose of the invention it is advantageous if the precursor is based on a carrier which has a particle size of from 0.02 to 3 mm, in particular from 0.04 to 1.5 mm. Further, it is advantageous if the carrier consists of silica or is a silica which is chemically bonded or physically associated with a component based on the elements aluminum, titanium, zirconium, molybdenum, vanadium or thorium, this component being an oxide of the particular element or a compound of the particular element which is converted to an oxide under the conditions of stage (1). In the case of carriers which in addition to silicon contain a foreign component, the latter may (calculated as oxide) account for up to 20, in particular up to 15, percent by weight, based on the total weight of the carrier. Particularly suitable carriers are silica/alumina mixtures containing from 0.1 to 15 percent by weight of alumina, based on the total weight of the carrier.

The catalyst precursor, i.e. the carrier charged in the conventional manner with a chromium compound which is chromium trioxide or a chromium compound which is converted to chromium trioxide under the conditions of stage (1), is treated, in a first stage (1), with oxygen in a specific manner defined above. It is particularly important that the solid should be in the form of a fluidized bed, and for this purpose the equipment and procedures conventionally used in fluidized bed processes may be employed. We have found that air is a particularly suitable carrier gas. We have further found that the duration of fluidization, which should be not less than 30 minutes, is not critical but that in general an advantageous duration is from 2 to 15 hours.

In a particular embodiment of the process according to the invention the oxygen treatment in stage (1) is combined with a treatment with a promoter. The promoters can be relevant conventional promoters, in particular ammonium silicofluoride $(NH_4)_2SiF_6$, and may be added to the catalyst precursor before or during fluidization.

Following the first stage (1), and before carrying out the second stage (2), it is advisable in virtually all cases, in order to achieve the desired effect, to flush the fluidized bed apparatus, with the solid in the form of a fluidized bed, by means of a stream of carrier gas comprising anhydrous and oxygen-free nitrogen, until the free oxygen introduced in the course of the first stage (1) has been displaced.

In a second stage (2) the product obtained from stage (1), which has preferably been flushed until oxygen-free, is treated with carbon monoxide in a particular manner defined above and thus converted to the actual supported chromium oxide catalyst. Here again it is particularly important that the solid should be in the form of a fluidized bed and that the carrier gas should be anhydrous and oxygen-free.

The manufacture of ethylene polymers using the novel catalysts is carried out by means of the solution polymerization process, in particular using cyclohexane as the solvent. The polymerization process as such exhibits no peculiarities, apart from the use of the catalyst manufactured according to the invention, and can be carried out in the relevant conventional technological embodiments. These are well-known from the literature (cf., for example, the basic content of German Patent No. 1,051,004, and the subsequently disclosed further developments) and from industrial practice, so that more detailed comments are superfluous, though it may be added that in the case of the manufacture of copolymers of ethylene with α-monoolefins, suitable monoolefins are in particular propene, 1-butene, 4-methyl-1-pentene, 1-hexene and 1-octene.

EXAMPLE 1

(a) Manufacture of the catalyst

The process starts from a catalyst precursor consisting of a silica/alumina mixed oxide which contains 0.4 percent by weight, based on the total weight of mixed oxide, of alumina, has a particle size of from 0.04 to 1.5 mm and is homogeneously charged with chromium trioxide in the weight ratio of carrier:chromium trioxide = 100:4.4.

This precursor is mixed with a promoter (ammonium silicofluoride) in the weight ratio of catalyst precursor:promoter = 100:2.5.

The procedure then followed is that, using a conventional fluidized bed apparatus,
(1) in a first stage the catalyst precursor, mixed with the promoter, is fluidized, by means of anhydrous air as the carrier gas, at 650° C. for a period of 10 hours, after which, in an intermediate stage, the fluidized bed apparatus, with the solid in the form of a fluidized bed, is flushed at 325° C. with anhydrous and oxygen-free nitrogen as the carrier gas until oxygen-free, whereupon
(2) in a second stage the flushed product obtained from the first stage (1) is fluidized at 325° C. for a period of 1 hour by means of anhydrous and oxygen-free nitrogen as the carrier gas, to which a total of 200 mole % of carbon monoxide, based on the chromium trioxide content of the product obtained from the first stage (1), is added uniformly over the total duration of the carbon monoxide treatment, and finally, in a last stage, the material is brought to room temperature whilst being fluidized with anhydrous and oxygen-free nitrogen.

The supported chromium oxide catalyst thus obtained is employed for polymerization as described below.

(b) Polymerization by means of the catalyst

A stirred autoclave is charged with 1,000 parts by weight of cyclohexane, after which it is flushed with nitrogen and 0.1 part by weight of catalyst is added. Pure ethylene is forced in, at a thermostatically controlled temperature of 150° C., until the pressure reaches 35 bars, and when this pressure has fallen to 25 bars as a result of the formation of polyethylene, ethylene is again forced in until the pressure reaches 35 bars, and this procedure is continued for 90 minutes. The polymerization is then stopped by cooling to room temperature and releasing the pressure.

610 parts by weight of polyethylene having a density of 0.96 g/cm$^3$ and a melt index $MI_{2.16}$ of 4.8 g/10 minutes are obtained.

EXAMPLE 2

(a) Manufacture of the catalyst

The process starts from a catalyst precursor consisting of a silica/alumina mixed oxide which contains 0.1 percent by weight, based on the total weight of mixed oxide, of alumina, has a particle size of from 0.04 to 1.5 mm and is homogeneously charged with chromium trioxide in the weight ratio of carrier:chromium trioxide = 100:2.0.

This precursor is mixed with a promoter (ammonium silicofluoride) in the weight ratio of catalyst precursor:promoter = 100:1.5.

The procedure then followed is that, using a conventional fluidized bed apparatus,
(1) in a first stage the catalyst precursor, mixed with the promoter, is fluidized, by means of anhydrous air as the carrier gas, at 550° C. for a period of 11 hours, after which, in an intermediate stage, the fluidized bed apparatus, with the solid in the form of a fluidized bed, is flushed at 290° C. with anhydrous and oxygen-free nitrogen as the carrier gas until oxygen-free, whereupon
(2) in a second stage the flushed product obtained from the first stage (1) is fluidized at 300° C. for a period of 1 hour by means of anhydrous and oxygen-free nitrogen as the carrier gas, to which a total of 150 mole % of carbon monoxide, based on the chromium trioxide content of the product obtained from the first stage (1) is added uniformly over the total duration of the carbon monoxide treatment, and finally, in a last stage, the material is brought to room temperature whilst being fluidized with anhydrous and oxygen-free nitrogen.

(b) Polymerization by means of the catalyst

This is carried out as described in Example 1.

540 parts by weight of polyethylene having a density of 0.96 g/cm$^3$ and a melt index $MI_{2.16}$ of 7 g/10 minutes are obtained.

EXAMPLE 3

(a) Manufacture of the catalyst

The process starts from a catalyst precursor consisting of a silica/alumina mixed oxide which contains 0.3 percent by weight, based on the total weight of mixed oxide, of alumina, has a particle size of from 0.04 to 1.5 mm and is homogeneously charged with chromium trioxide in the weight ratio of carrier:chromium trioxide = 100:4.5.

The procedure then followed is that, using a conventional fluidized bed apparatus,
(1) in a first stage the catalyst precursor is fluidized, by means of anhydrous air as the carrier gas, at 680° C. for a period of 8 hours, after which, in an intermediate stage, the fluidized bed apparatus, with the solid in the form of a fluidized bed, is flushed at 300° C. with anhydrous and oxygen-free nitrogen as the carrier gas until oxygen-free, whereupon (2) in a second stage the flushed product obtained from the first stage (1) is fluidized at 330° C. for a period of 1 hour by means of anhydrous and oxygen-free nitrogen as the carrier gas, to which a total of 300 mole % of carbon monoxide, based on the chromium trioxide content of the product obtained from the first stage (1) is added uniformly over the total duration of the carbon monoxide treatment, and finally, in a last stage, the material is brought to room temperature whilst being fluidized with anhydrous and oxygen-free nitrogen.

(b) Polymerization by means of the catalyst

This is carried out as described in Example 1.

620 parts by weight of polyethylene having a density of 0.96 g/cm$^3$ and a melt index $MI_{2.16}$ of 5.1 g/10 minutes are obtained.

EXAMPLE 4

(a) Manufacture of the catalyst

The procedure followed is as described in Example 3, except that the first stage (1) is carried out at 570° C. instead of 680° C.

(b) Polymerization by means of the catalyst

The procedure followed is as described in Example 1 except that the temperature is 146° C. instead of 150° C. and that instead of ethylene a mixture of 98.5 parts by weight of ethylene and 1.5 parts by weight of 1-butene is polymerized.

575 parts by weight of an ethylene/1-butene copolymer having a density of 0.94 g/cm$^3$ and a melt index $MI_{2.16}$ of 5.2 g/10 minutes are obtained.

I claim:

1. A process for the manufacture of a supported chromium oxide catalyst from a catalyst precursor—which in turn comprises a finely divided carrier consisting of, or based on, silica, homogeneously charged with a chromium compound, which consists of chromium trioxide or a chromium compound which is converted to chromium trioxide under the conditions of stage (1), in the weight ratio of carrier: chromium compound, calculated as chromium trioxide, of from 100:0.1 to 100:10—by
    (1) treating the catalyst precursor—with addition of a promoter in the weight ratio of catalyst precursor: promoter of from 100:0.1 to 100:10—at an elevated temperature with an oxygen-containing gas and then
    (2) treating the product obtained from stage (1) with from 150 to 400 mole percent of carbon monoxide, based on the chromium dioxide content of the product, wherein, in both stages (1) and (2), the solid is in the form of a fluidized bed maintained by means of a stream of carrier gas, and wherein furthermore, in stage (1), the treatment with oxygen is carried out at from 530° to 1200° C. for a period of at least 30 minutes, using an anhydrous carrier gas which comprises from 10 to 100% by volume of oxygen, the remainder consisting of from 90 to 0% by volume of nitrogen, and in stage (2) the carbon monoxide treatment is carried out at from 270° to 450° C. for a period of from 0.5 to 3 hours using an anhydrous and oxygen-free carrier gas consisting of nitrogen to which a total of from 100 to 1,000 mole %, based on the chromium trioxide content of the product obtained from stage (1), of carbon monoxide is added uniformly over the total period of the carbon monoxide treatment.

2. The process of claim 1, wherein the promoter is ammonium silico fluoride.

* * * * *